United States Patent
Choi et al.

(10) Patent No.: US 9,354,464 B2
(45) Date of Patent: May 31, 2016

(54) LIQUID CRYSTAL DISPLAY APPARATUS HAVING IMPROVED LIGHT LEAKAGE CHARACTERISTICS

(71) Applicant: Samsung Display Co., LTD., Yongin, Gyeonggi-Do (KR)

(72) Inventors: Yun-Seok Choi, Hwaseong-si (KR); Soon-Kyoung Kwon, Seoul (KR); Hyo-Chul Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/450,058

(22) Filed: Aug. 1, 2014

(65) Prior Publication Data
US 2015/0219941 A1 Aug. 6, 2015

(30) Foreign Application Priority Data
Feb. 4, 2014 (KR) ........................ 10-2014-0012637

(51) Int. Cl.
*G02F 1/1333* (2006.01)
*F21V 8/00* (2006.01)
*G02F 1/1335* (2006.01)

(52) U.S. Cl.
CPC .... *G02F 1/133512* (2013.01); *G02F 1/133308* (2013.01); *G02F 2001/133317* (2013.01); *G02F 2202/28* (2013.01)

(58) Field of Classification Search
CPC .................................................... G02F 1/1336
USPC ........................................................ 349/58
See application file for complete search history.

(56) References Cited

U.S. PATENT DOCUMENTS

| 4,065,649 | A | 12/1977 | Carter et al. |
| 7,221,415 | B2 | 5/2007 | Ono et al. |
| 7,760,284 | B2* | 7/2010 | Murase ............... G02F 1/13452 257/88 |
| 2012/0255677 | A1 | 10/2012 | Kigami et al. |
| 2015/0181731 | A1* | 6/2015 | Lin ......................... B32B 37/12 361/749 |

FOREIGN PATENT DOCUMENTS

| JP | 11-212483 A | 8/1999 |
| JP | 2009-001628 A | 1/2009 |
| KR | 2003-0024015 A | 3/2003 |
| KR | 10-1168403 B1 | 7/2012 |

* cited by examiner

*Primary Examiner* — Joseph L Williams
(74) *Attorney, Agent, or Firm* — Innovation Counsel LLP

(57) ABSTRACT

A liquid crystal display apparatus includes a display panel, a light source module configured to provide light to the display panel, a receiving container receiving the light source module therein, and an adhesion member disposed between the display panel and the receiving container to couple the display panel to the receiving container. The adhesion member includes a base layer with a hollow pocket therein and an adhesion layer disposed on both surface of the base layer. When the display panel is deformed, the adhesion member conforms thereto. Thus, light-leakage of the display panel may be prevented and light characteristics of the liquid crystal display apparatus may be improved.

15 Claims, 3 Drawing Sheets

LIQUID CRYSTAL DISPLAY APPARATUS HAVING IMPROVED LIGHT LEAKAGE CHARACTERISTICS

This application claims priority to Korean Patent Application No. 10-2014-0012637, filed on Feb. 4, 2014, and all the benefits accruing therefrom under 35 U.S.C. §119, the content of which is incorporated by reference herein in its entirety.

BACKGROUND

1. Field

Example embodiments relate generally to flat panel displays. More specifically, example embodiments relate to a liquid crystal display apparatus having improved light-leakage characteristics.

2. Description of the Related Art

Recently, efforts have focused on developing a liquid display apparatus having light weight and small size. Traditionally, cathode ray tube (CRT) display apparatuses have been used due to their performance and competitive price. However, the CRT display apparatus has the drawbacks of excessive size and low portability. Therefore, the liquid crystal display apparatus has been highly regarded due to its small size, light weight and low-power-consumption, rendering it superior to CRT displays.

The liquid crystal display apparatus includes a display panel including liquid crystal, as well as a light source module to emit light from the rear of the display panel. An adhesion member may be used to combine the display panel and the light source module.

However, as a thickness of the display panel is reduced and as a display panel that can bend is developed, the adhesion of this adhesion member is decreased. Thus, light-leakage of the display panel may begin to occur.

SUMMARY

One or more example embodiments of the inventive concept provide a liquid crystal display apparatus capable of improved light-leakage of a display panel.

According to an example embodiment of the inventive concept, a liquid crystal display apparatus includes a display panel, a light source module configured to provide a light to the display panel, a receiving container receiving the light source module therein, and an adhesion member disposed between the display panel and the receiving container to couple the display panel to the receiving container. The adhesion member includes a base layer with a hollow pocket therein and adhesion layers disposed on opposing surfaces of the base layer.

In an example embodiment, the adhesion member may extend along an edge of the display panel.

In an example embodiment, a height of the base layer may be from about 0.1 mm to about 1 mm.

In an example embodiment, the receiving container may have a frame shape surrounding the display panel and the light source module and may include a protrusion part protruding from an inner side surface of the receiving container in a first direction toward a center of the receiving container, and the display panel may be disposed on the protrusion part.

In an example embodiment, the receiving container may include a recess disposed on an upper surface of the protrusion part.

In an example embodiment, the adhesion member may be disposed in the recess of the receiving container.

In an example embodiment, the receiving container may further include a supporting part extending in a direction perpendicular to the first direction, so as to surround a side of the display panel.

In an example embodiment, the liquid crystal display apparatus may further include a protection window that is coupled to the supporting part and that covers a display area of the display panel.

In an example embodiment, the display panel may be coupled to the protection window by an adhesive. The adhesive may include any one or more of acrylic resin, rubber resin, urethane resin, silicon resin, polyvinylether resin, phenol resin, urea resin, melamine resin, epoxy resin and polyester resin.

In an example embodiment, the light source module may include a light source configured to generate light, a light guide plate positioned to receive the light from the light source, a reflection layer disposed under the light guide plate and an optical sheet disposed on the light guide plate.

In an example embodiment, the light source module may be disposed under the protrusion part.

In an example embodiment, the base layer may include polyethyleneterephthalate.

In an example embodiment, the display panel may include a display area configured to display an image and a peripheral area surrounding the display area, and the adhesion member may be disposed under the peripheral area.

In an example embodiment, the base layer may include a plurality of the hollow pockets horizontally spaced apart from each other.

In an example embodiment, the base layer may include a plurality of the hollow pockets vertically spaced apart from each other.

According to the example embodiments of the inventive concept, when a display panel of a liquid crystal display apparatus including an adhesion member including a hollow is bended, the adhesion member serves to buffer the display panel. Thus, light-leakage of the display panel may be prevented and light characteristics of the liquid crystal display apparatus may be improved.

BRIEF DESCRIPTION OF THE DRAWINGS

The above and other features of the inventive concept will become more apparent by describing in detail example embodiments thereof with reference to the accompanying drawings, in which.

The various figures are not to scale. Like reference numerals refer to corresponding parts throughout the figures.

DETAILED DESCRIPTION OF EXAMPLE EMBODIMENTS

Hereinafter, the inventive concept will be explained in detail with reference to the accompanying drawings.

Figure 1:
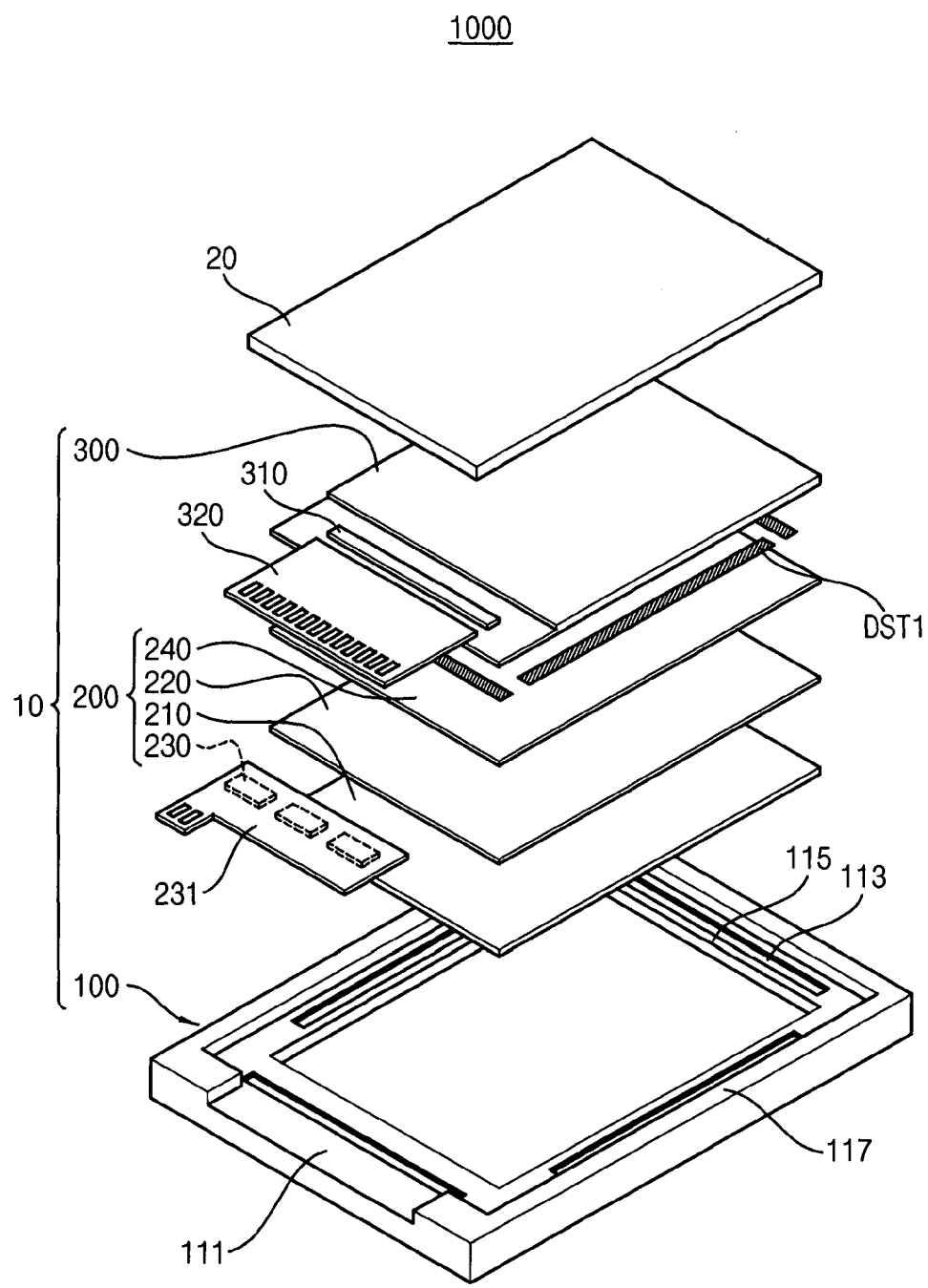
FIG. 1 is an exploded perspective view illustrating a liquid crystal display apparatus in accordance with an example embodiment of the inventive concept.
Figure 2:
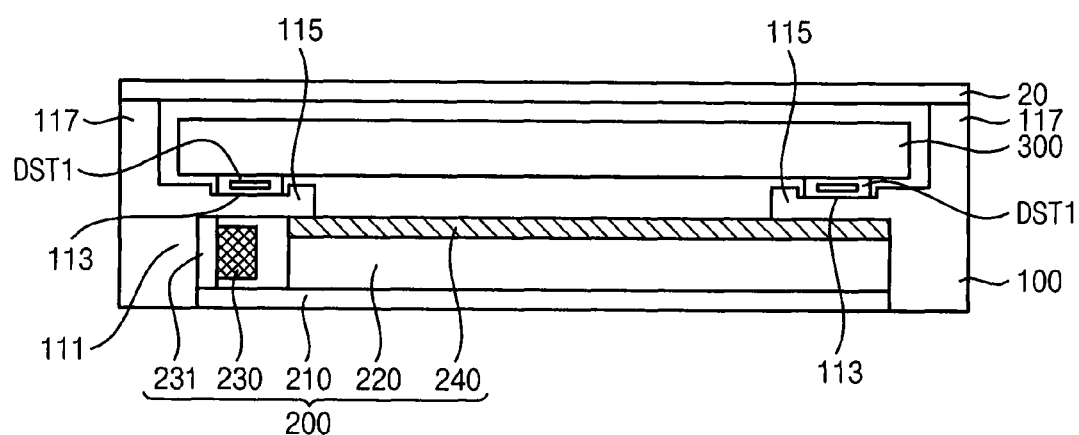
FIG. 2 is a cross-sectional view illustrating a liquid crystal display apparatus of FIG. 1.

FIG. 1 is an exploded perspective view illustrating a liquid crystal display apparatus in accordance with an example embodiment of the inventive concept. FIG. 2 is a cross-sectional view illustrating a liquid crystal display apparatus of FIG. 1.

Referring to FIGS. 1 and 2, a liquid crystal display apparatus 1000 includes a liquid crystal display module 10 and a protection window 20. The liquid crystal display module 10 displays an image and includes a receiving container 100, a light source module 200 and a display panel 300.

The receiving container 100 may have a rectangular frame shape in a plan view and may receive the light source module 200 and the display panel 300. The receiving container 100 may include, or be made of, a plastic. For example, the receiving container 100 may be a mold frame having a shape surrounding the light source module 200.

The receiving container 100 may include a light source receiving part 111 to receive a light source 230 generating a light, one or more recesses 113, a protrusion part 115 and a supporting part 117.

The light source receiving part 111 may be a lower part of the receiving container 100 to receive the light source module 200.

The recesses 113 may be formed on an upper surface of the protrusion part 115. Each recess 113 may have a rectangular shape. An adhesion member DST1 is disposed in each recess 113, and a bottom surface of each recess 113 may be combined with a surface of the respective adhesion member DST1. In an example embodiment, a plurality of recesses 113 may be arranged to surround the display panel 300. Any number of recesses 113 is contemplated.

The protrusion part 115 may protrude in a horizontal direction from the light source receiving part 111 inward toward a center of the receiving container 100. The protrusion part 115 may be disposed on the light source receiving part 111. The display panel 300 may be disposed on the protrusion part 115.

The supporting part 117 may extend in a direction perpendicular to a protruding direction of the protrusion part 115 to surround the display panel 300. That is, the supporting part 117 extends along the perimeter of the receiving container 100, parallel to its edges.

In an example embodiment, the light source receiving part 111, the recess 113, the protrusion part 115 and the supporting part 117 of the receiving container 100 may be integrally formed as a single unitary structure, and may provide a space to receive the light source module 200 and the display panel 300.

The light source module 200 may be disposed under the protrusion part 115 of the receiving container 100. The light source module 200 may generate a light that is directed upon the display panel 300. The light source module 200 may include a reflection layer 210, a light guide plate 220, a light source 230 and an optical sheet 240.

The reflection layer 210 may be disposed under the light guide plate 220. The reflection layer 210 may reflect a light from the light source 230 toward the display panel 300.

The light guide plate 220 may be disposed on the reflection layer 210. The light guide plate 220 may receive light from the light source 230. The light guide plate 220 may extend horizontally to guide a light from the light source 230 to the optical sheet 240. The light guide plate 220 changes the light distribution of a point light source to the light distribution of a surface light source.

For example, the light guide plate 220 may be a flat light guide plate having equal thickness from a first end of the light guide plate 220 adjacent to the light source 230 to a second end opposing the first end. In another embodiment, the light guide plate 220 may be a wedge-shaped light guide plate. For example, a thickness of the light guide plate 220 may increase gradually with decreasing distance from the light sources 230.

Light from the light guide plate 220 may have a relatively low uniformity. Thus, when a light source module 200 includes only a light guide plate 220 without the optical sheet 240, it is difficult to provide a light for high-quality display. The optical sheet 240 may include a diffusion sheet to improve a brightness uniformity, a prism sheet to improve a viewing angle, a dual brightness enhancement film (DBEF) to increase a brightness and a viewing-angle, etc.

The light source 230 may generate light directed toward the light guide plate 220. The light source 230 may be disposed on a printed circuit board 231. The printed circuit board 231 may be disposed under the protrusion part 115. The printed circuit board 231 may apply a voltage to the light source 230 to generate light.

The optical sheet 240 may be disposed on the light guide plate 220 to improve characteristics of light passing through the light guide plate 220.

The display panel 300 may be disposed in the receiving container 100. The display panel 300 may display an image by controlling the light pixel-by-pixel. For example, the display panel 300 may include a thin film transistor (TFT) substrate, a color filter substrate, a liquid crystal layer between the thin film transistor substrate and the color filter substrate, and polarizing filters (not shown) disposed under the thin film transistor substrate and on the color filter substrate.

The thin film transistor substrate may include pixel electrodes disposed in a matrix configuration, thin film transistors applying driving voltages to the pixel electrodes, gate lines and data lines.

The color filter substrate may include color filters disposed on the thin film transistor substrate to face their respective pixel electrodes, and a common electrode disposed on the color filter.

A driver IC 310 may be disposed on the display panel 300. The display panel 300 and a connection substrate 320 may be connected to an external interface.

The protection window 20 may be disposed on the liquid crystal module 10. The protection window 20 may cover a display area of the display panel 300 and may protect the display panel 300 and the driver IC 310. The protection window 20 may include a transparent material such as a plastic, a reinforced plastic, glass or reinforced glass.

The remainder of the liquid crystal display apparatus 1000 may be combined with the supporting part 117 of the receiving container 100. The display panel 300 may be combined with the protection window 20 by an adhesive. For example, the adhesive may include a photo-curable resin or a thermosetting resin. For instance, the adhesive may include acrylic resin, rubber resin, urethane resin, silicon resin, polyvinylether resin, phenol resin, urea resin, melamine resin, epoxy resin or polyester resin.

Figure 3:
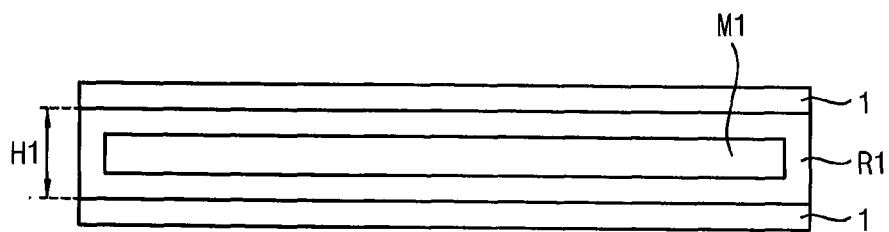
FIG. 3 is a cross-sectional view illustrating an adhesion member of a liquid crystal display apparatus of FIG. 1.

FIG. 3 is a cross-sectional view illustrating an adhesion member of a liquid crystal display apparatus of FIG. 1.

Referring to FIGS. 2 and 3, adhesion members DST1 may be disposed between the display panel 300 and the light source module 200 to combine the display panel 300 with the light source module 200. Each adhesion member DST1 may be disposed in a recess 113 between the display panel 300 and the receiving container 100. Each adhesion member DST1 may have a rectangular shape extending along an edge of the display panel 300 adjacent to the adhesion member DST1. The light source module 200 may be easily combined with the display panel 300 by the adhesion member DST1.

As nonlimiting examples, the adhesion members DST1 may include synthetic rubber, polyimide or polyethyleneterephtalate. Preferably, the adhesion members DST1 may include polyethyleneterephtalate. Each adhesion member DST1 may include a base layer R1 including a hollow pocket or space M1, and an adhesion layer 1 disposed on both surfaces of the base layer R1.

A first surface of the adhesion layer 1 may contact the bottom surface of the recess 113 and a second surface opposing the first surface may contact a lower surface of the display panel 300.

The adhesion layer 1 may include a material having an adhesiveness. For example, the adhesion layer 1 may include butyl acrylate, ethyl acrylate or the like. An initiator may be used such as benzoyl peroxide (BPO), and a solvent may be used such as ethylacetate.

The base layer R1 may not have an adhesiveness by itself, but the base layer R1 may maintain an adhesion between the display panel 300 and the light source module 200 through the adhesion layer 1, and may support the adhesion layer 1.

A height H1 of the base layer R1 that is a gap between the both adhesion layers 1 may be about 0.1 mm to about 1 mm. A size and a shape of the hollow M1 may be changed depending on bending of the display panel 300 by an external pressure.

The liquid crystal display apparatus 1000 may include a display area displaying an image and a peripheral area to receive a signal from an external driving circuit. The adhesion member DST1 may be disposed under the peripheral area (and, in some embodiments, not under the display area) to block a light incident to the peripheral area.

Figure 4:
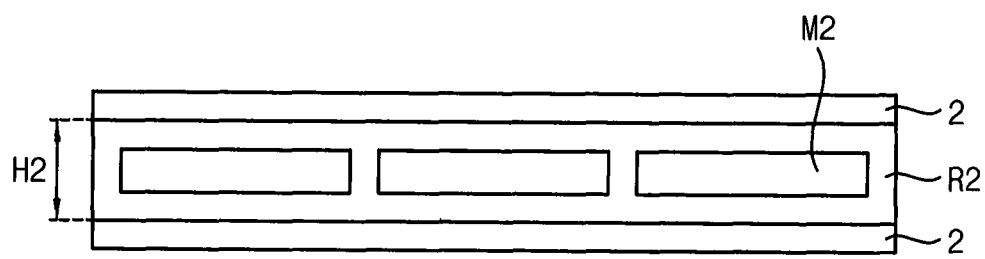
FIG. 4 is a cross-sectional view illustrating an adhesion member in accordance with an example embodiment of the inventive concept.

FIG. 4 is a cross-sectional view illustrating an adhesion member in accordance with an example embodiment of the inventive concept.

Referring to FIGS. 1, 2 and 4, an adhesion member DST2 may be disposed between a display panel 300 and a light source module 200 to combine the display panel 300 with the light source module 200. The adhesion member DST2 may be overlapped with an edge of the display panel 300 and an edge of the light source module 200. The adhesion member DST2 may have a rectangular shape extending along an edge of the display panel 300 adjacent to the adhesion member DST2.

As nonlimiting examples, the adhesion member DST2 may include synthetic rubber, polyimide or polyethyleneterephtalate. Preferably, the adhesion member DST2 may include polyethyleneterephtalate. The adhesion member DST2 may include a base layer R2 including a plurality of hollows or hollow pockets M2 and an adhesion layer 2 disposed on both surfaces of the base layer R2. A plurality of the hollows M2 may be spaced apart from each other. A plurality of the hollows M2 may be disposed with major axes extending in a direction parallel with the major axes of the adhesion layers 2.

A first surface of the adhesion layer 2 may contact the bottom surface of its recess 113 and a second surface opposing the first surface may contact a surface of the display panel 300.

The adhesion layer 2 may include a material having an adhesiveness. For example, the adhesion layer 2 may include butyl acrylate, ethyl acrylate or the like. An initiator may be used such as benzoyl peroxide (BPO), and a solvent may be used such as ethylacetate.

The base layer R2 may not have an adhesiveness by itself, but the base layer R2 may maintain an adhesion between the display panel and the light source module through the adhesion layers 2, and may support the adhesion layers 2.

A height H2 of the base layer R2 that is a gap between the two adhesion layers 2 may be about 0.1 mm to about 1 mm. A size and a shape of the hollow M2 may be changed depending on bending of the display panel 300 by an external pressure.

Figure 5:
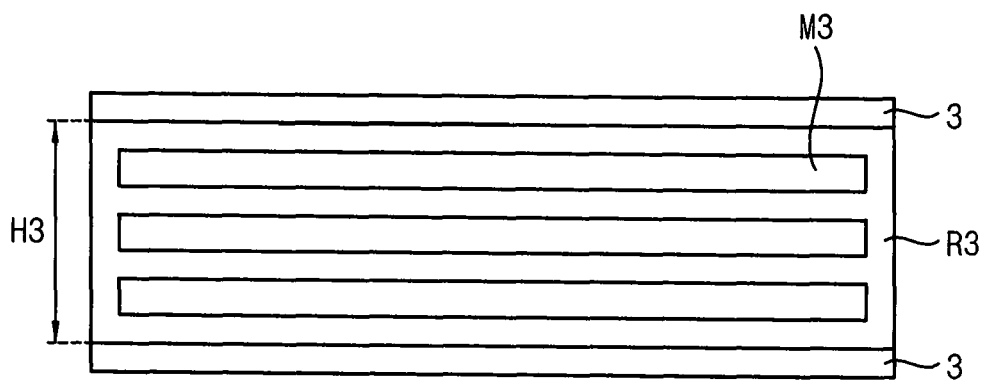
FIG. 5 is a cross-sectional view illustrating an adhesion member in accordance with an example embodiment of the inventive concept.

FIG. 5 is a cross-sectional view illustrating an adhesion member in accordance with an example embodiment of the inventive concept.

Referring to FIGS. 1, 2 and 5, adhesion members DST3 may be disposed between a display panel 300 and a light source module 200 to combine the display panel 300 and the light source module 200. Each adhesion member DST3 may be overlapped with an edge of the display panel 300 and an edge of the light source module 200. Each adhesion member DST3 may have a rectangular shape extending along an edge of the display panel 300 adjacent to the adhesion member DST3.

As nonlimiting examples, the adhesion member DST3 may include synthetic rubber, polyimide or polyethyleneterephtalate. Preferably, the adhesion member DST3 may include polyethyleneterephtalate.

The adhesion member DST3 may include a base layer R3 including a plurality of hollow pockets M3, and an adhesion layer 3 disposed on both surfaces of the base layer R3. A plurality of hollows M3 may be spaced apart from each other. A plurality of the hollows M3 may be disposed upon each other in a direction perpendicular to an upper or lower surface of the adhesion layer 3.

A first surface of the adhesion layer 3 may contact the bottom surface of a recess 113 and a second surface opposing the first surface may contact a surface of the display panel 300.

The adhesion layer 3 may include a material having an adhesiveness. For example, the adhesion layer 3 may include butyl acrylate, ethyl acrylate or the like. An initiator may be used such as benzoyl peroxide (BPO), and a solvent may be used such as ethylacetate.

The base layer R3 may not have an adhesiveness by itself, but the base layer R3 may maintain an adhesion between the display panel 300 and the light source module 200 through the adhesion layer 3, and may support the adhesion layer 3.

A height H3 of the base layer R3 that is a gap between the two adhesion layers 3 may be about 0.1 mm to about 1 mm. A size and a shape of the hollow M3 may be changed depending on bending of the display panel 300 by an external pressure.

The liquid crystal display apparatus 1000 may include a display area displaying an image and a peripheral area to receive a signal from an external driving circuit. The adhesion members DST1, DST2 and DST3 may be disposed to overlap with the peripheral area (and, in some embodiments, only the peripheral area) to block a light incident to the peripheral area.

The adhesion members of embodiments of the invention provide for flexible members that conform to their display panel, blocking unwanted light even when the display panel flexes and deforms.

For example, when an external pressure is applied to the display panel, the display panel is bent. Since each adhesion member is flexible and includes one or more hollow pockets therein, the adhesion members may expand or contract to deform along with the display panel. Accordingly, when the display panel is bent by an external pressure, the adhesion members deform along with the display panel. Thus, light-leakage of the display panel may be prevented even when the display panel undergoes deformation, and light characteristics of the liquid crystal display apparatus may therefore be improved.

An adhesion member according to one or more embodiments of the present invention may be used for a display apparatus. In one or more embodiments, the adhesion member may be used in one or more of a liquid crystal display apparatus, an organic EL display apparatus, a circuit substrate having a thin film transistor, a semiconductor device, etc.

The foregoing is illustrative of the inventive concept and is not to be construed as limiting thereof. Although a few example embodiments of the inventive concept have been described, those skilled in the art will readily appreciate that many modifications are possible in the example embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific example embodiments disclosed, and that modifications to the disclosed example embodiments, as well as other example embodiments, are intended to be included within the scope of the appended claims. The inventive concept is defined by the following claims, with equivalents of the claims to be included therein. Various features of the various embodiments can be mixed and matched in any manner, to form further embodiments contemplated by the invention.

What is claimed is:

1. A liquid crystal display apparatus, comprising:
   a display panel;
   a light source module configured to provide light to the display panel;
   a receiving container receiving the light source module therein; and
   an adhesion member disposed between the display panel and the receiving container to couple the display panel to the receiving container, the adhesion member comprising a base layer having a plurality of connected sidewalls, outer surfaces of the sidewalls forming outer surfaces of the base layer and inner surfaces of the sidewalls forming outer surfaces of a hollow pocket within the base layer, the adhesion member further comprising adhesion layers disposed on opposing surfaces of the base layer.

2. The liquid crystal display apparatus of claim 1, wherein the adhesion member extends along an edge of the display panel.

3. The liquid crystal display apparatus of claim 2, wherein a height of the base layer is from about 0.1 mm to about 1 mm.

4. The liquid crystal display apparatus of claim 2, wherein the receiving container has a frame shape surrounding the display panel and the light source module, and comprises a protrusion part protruding from an inner side surface of the receiving container in a first direction toward a center of the receiving container, and wherein the display panel is disposed on the protrusion part.

5. The liquid crystal display apparatus of claim 4, wherein the receiving container comprises a recess on an upper surface of the protrusion part.

6. The liquid crystal display apparatus of claim 5, wherein the adhesion member is disposed in the recess of the receiving container.

7. The liquid crystal display apparatus of claim 4, wherein the receiving container further comprises a supporting part extending in a direction perpendicular to the first direction, so as to surround a side of the display panel.

8. The liquid crystal display apparatus of claim 7, further comprising a protection window that is coupled to the supporting part and that covers a display area of the display panel.

9. The liquid crystal display apparatus of claim 8, wherein the display panel is coupled to the protection window by an adhesive, the adhesive comprising at least one of acrylic resin, rubber resin, urethane resin, silicon resin, polyvinylether resin, phenol resin, urea resin, melamine resin, epoxy resin and polyester resin.

10. The liquid crystal display apparatus of claim 1, the light source module comprises:
    a light source configured to generate light;
    a light guide plate positioned to receive the light from the light source;
    a reflection layer disposed under the light guide plate; and
    an optical sheet disposed on the light guide plate.

11. The liquid crystal display apparatus of claim 10, wherein the light source module is disposed under the protrusion part.

12. The liquid crystal display apparatus of claim 1, wherein the base layer comprises polyethyleneterephthalate.

13. The liquid crystal display apparatus of claim 1, the display panel comprises a display area configured to display an image and a peripheral area surrounding the display area, wherein the adhesion member is disposed under the peripheral area.

14. The liquid crystal display apparatus of claim 1, wherein the base layer comprises a plurality of the hollow pockets horizontally spaced apart from each other.

15. The liquid crystal display apparatus of claim 1, wherein the base layer comprises a plurality of the hollow pockets vertically spaced apart from each other.

* * * * *